US009311465B2

(12) United States Patent
McNulty

(10) Patent No.: US 9,311,465 B2
(45) Date of Patent: Apr. 12, 2016

(54) SECURE INFORMATION STORAGE AND RETRIEVAL APPARATUS AND METHOD

(76) Inventor: James McNulty, Paulsboro, NJ (US)

( * ) Notice: Subject to any disclaimer, the term of this patent is extended or adjusted under 35 U.S.C. 154(b) by 1317 days.

(21) Appl. No.: 12/586,322

(22) Filed: Sep. 21, 2009

(65) Prior Publication Data

US 2011/0072264 A1 Mar. 24, 2011

(51) Int. Cl.
H04L 29/06 (2006.01)
G06F 21/32 (2013.01)
G06F 21/62 (2013.01)
H04L 9/08 (2006.01)
H04L 9/32 (2006.01)

(52) U.S. Cl.
CPC ............ *G06F 21/32* (2013.01); *G06F 21/6209* (2013.01); *G06F 21/6245* (2013.01); *G06F 21/6272* (2013.01); *H04L 9/0894* (2013.01); *H04L 9/3242* (2013.01); *G06F 2221/2117* (2013.01)

(58) Field of Classification Search
USPC .......................... 713/168, 186; 380/278, 286
See application file for complete search history.

(56) References Cited

U.S. PATENT DOCUMENTS

| 6,484,260 | B1* | 11/2002 | Scott et al. | 713/186 |
| 7,801,303 | B2* | 9/2010 | Dulac | 380/200 |
| 2003/0046237 | A1* | 3/2003 | Uberti | 705/44 |
| 2004/0091114 | A1* | 5/2004 | Carter et al. | 380/259 |
| 2005/0240779 | A1* | 10/2005 | Aull et al. | 713/186 |
| 2007/0106895 | A1* | 5/2007 | Huang et al. | 713/170 |
| 2008/0059380 | A1* | 3/2008 | Bleahen | 705/67 |
| 2010/0005293 | A1* | 1/2010 | Errico | 713/165 |

OTHER PUBLICATIONS

"Strong security for distributed file systems"; Miller et al; IEEE, 20th international performance computing conference, 2001 7 pages.*

* cited by examiner

Primary Examiner — Jason Lee

(57) ABSTRACT

A user using a client computer registers with a server computer over a computer network by submitting a biometric scan of a body part of the user. The user commands the client computer to encrypt an electronic file. The client computer generates a private key, encrypts the electronic file and transmits the key to the server computer. The client computer saves the encrypted file. The encrypted file and the key are saved at different physical locations. The owner of the file is able to grant permission to other registered users to unlock the encrypted file.

5 Claims, 10 Drawing Sheets

SECURE INFORMATION STORAGE AND RETRIEVAL APPARATUS AND METHOD

I. REFERENCE TO A COMPUTER PROGRAM LISTING APPENDIX

A computer program listing appendix is attached to this document in the form of a compact disc pursuant to 37 CFR 1.52(e), 1.77(b)(5) and 1.96(c). The following files of the compact disc are hereby incorporated by reference:

| Date of creation | | size in bytes | Name |
|---|---|---|---|
| Directory of C:\IMM-source\CSA | | | |
| 03/06/2009 | 01:28 PM | 1,282 | AssemblyInfo.cs.txt |
| 05/20/2009 | 01:29 PM | 16,073 | BlowfishAlgorithm.cs.txt |
| 05/20/2009 | 11:25 AM | 16,604 | BlowfishCBC.cs.txt |
| 05/20/2009 | 11:25 AM | 17,605 | BlowfishCFB.cs.txt |
| 05/20/2009 | 11:25 AM | 39,342 | BlowfishECB.cs.txt |
| 05/20/2009 | 11:25 AM | 8,785 | BlowfishSimple.cs.txt |
| 08/28/2009 | 02:11 PM | 6,722 | CaptureForm.cs.txt |
| 08/28/2009 | 01:49 PM | 12,043 | CaptureForm.designer.cs.txt |
| 09/10/2009 | 07:41 PM | 9,810 | CCWform.cs.txt |
| 06/21/2009 | 06:48 PM | 27,395 | CCWform.Designer.cs.txt |
| 09/10/2009 | 09:28 PM | 13,441 | CCWNew.cs.txt |
| 09/10/2009 | 09:28 PM | 43,014 | CCWNew.Designer.cs.txt |
| 06/14/2009 | 01:26 AM | 1,162 | ChooseFile.cs.txt |
| 06/14/2009 | 01:26 AM | 4,211 | ChooseFile.Designer.cs.txt |
| 05/19/2009 | 03:16 PM | 519 | CSAMain.cs.txt |
| 05/19/2009 | 03:16 PM | 7,473 | CSAMain.Designer.cs.txt |
| 05/19/2009 | 02:47 PM | 2,333 | EnrollmentForm.cs.txt |
| 09/08/2009 | 03:13 AM | 14,386 | FileLocker.cs.txt |
| 09/01/2009 | 01:05 PM | 18,938 | FileLocker.Designer.cs.txt |
| 09/11/2009 | 12:36 AM | 978 | FileOpener.cs.txt |
| 09/10/2009 | 11:03 PM | 3,413 | FileOpener.Designer.cs.txt |
| 09/17/2009 | 10:16 AM | 43,368 | Form1.cs.txt |
| 09/08/2009 | 03:05 AM | 30,110 | Form1.Designer.cs.txt |
| 06/05/2009 | 03:16 PM | 969 | LicenseForm.cs.txt |
| 06/05/2009 | 03:16 PM | 3,384 | LicenseForm.Designer.cs.txt |
| 06/22/2009 | 11:49 PM | 10,782 | ModifyForm.cs.txt |
| 06/22/2009 | 11:49 PM | 27,411 | ModifyForm.Designer.cs.txt |
| 09/11/2009 | 12:37 AM | 23,750 | MyFilesForm.cs.txt |
| 09/10/2009 | 10:08 PM | 38,501 | MyFilesForm.Designer.cs.txt |
| 06/15/2009 | 10:46 PM | 417 | MyPolicy.cs.txt |
| 06/14/2009 | 02:42 AM | 512 | PInstanceItem.cs.txt |
| 08/31/2009 | 03:22 PM | 6,602 | POMform.cs.txt |
| 05/25/2009 | 04:21 AM | 13,609 | POMform.Designer.cs.txt |
| 09/17/2009 | 12:14 AM | 658 | Program.cs.txt |
| 08/31/2009 | 04:52 PM | 9,485 | Reference.cs.txt |
| 03/06/2009 | 01:28 PM | 2,847 | Resources.Designer.cs.txt |
| 08/31/2009 | 12:49 PM | 14,703 | ress.Designer.cs.txt |
| 08/31/2009 | 04:52 PM | 2,216 | Settings.Designer.cs.txt |
| 03/26/2009 | 08:44 PM | 353 | UruFileItem.cs.txt |
| 06/21/2009 | 01:58 AM | 380 | utils.cs.txt |
| | 40 File(s) | 495,586 bytes | |
| Directory of C:\IMM-source\filestore | | | |
| 08/31/2009 | 04:19 PM | 1,623 | fs9935.asmx.cs.txt |
| Directory of C:\IMM-source\server | | | |
| 09/02/2009 | 10:41 PM | 464 | account.aspx.cs.txt |
| 09/13/2009 | 02:46 PM | 489 | account.aspx.designer.cs.txt |
| 09/13/2009 | 02:47 PM | 281 | account.aspx.txt |
| 09/03/2009 | 06:49 AM | 463 | admin.aspx.cs.txt |
| 09/03/2009 | 06:49 AM | 488 | admin.aspx.designer.cs.txt |
| 09/13/2009 | 02:52 PM | 497 | admin.aspx.txt |
| 03/10/2009 | 02:03 AM | 1,411 | AssemblyInfo.cs.txt |
| 09/17/2009 | 07:05 PM | 68,089 | bw56195.asmx.cs.txt |
| 09/17/2009 | 08:46 PM | 6,580 | CaptchaClass.cs.txt |
| 09/03/2009 | 06:46 AM | 3,210 | confirm.aspx.cs.txt |
| 05/19/2009 | 01:34 AM | 548 | confirm.aspx.designer.cs.txt |
| 06/05/2009 | 03:31 AM | 423 | confirm.aspx.txt |
| 09/07/2009 | 08:45 PM | 2,709 | events.aspx.cs.txt |
| 09/13/2009 | 01:47 PM | 625 | events.aspx.designer.cs.txt |
| 09/13/2009 | 03:38 PM | 2,312 | events.aspx.txt |
| 09/02/2009 | 10:42 PM | 461 | home.aspx.cs.txt |
| 09/13/2009 | 02:46 PM | 486 | home.aspx.designer.cs.txt |
| 09/13/2009 | 02:47 PM | 277 | home.aspx.txt |
| 09/17/2009 | 08:34 PM | 1,112 | jpegimage.aspx.cs.txt |

-continued

| Date of creation | | size in bytes | Name |
|---|---|---|---|
| 09/03/2009 | 12:02 AM | 548 | jpegimage.aspx.designer.cs.txt |
| 09/03/2009 | 12:02 AM | 454 | jpegimage.aspx.txt |
| 09/03/2009 | 05:52 AM | 2,047 | login.aspx.cs.txt |
| 09/03/2009 | 12:17 AM | 549 | login.aspx.designer.cs.txt |
| 09/17/2009 | 08:35 PM | 5,192 | login.aspx.txt |
| 09/13/2009 | 03:42 PM | 1,502 | masterpage1.Master.cs.txt |
| 09/13/2009 | 02:55 PM | 1,165 | masterpage1.Master.designer.cs.txt |
| 09/03/2009 | 06:34 PM | 3,659 | pendingusers.aspx.cs.txt |
| 09/13/2009 | 03:44 PM | 619 | pendingusers.aspx.designer.cs.txt |
| 09/13/2009 | 03:44 PM | 2,629 | pendingusers.aspx.txt |
| 09/12/2009 | 01:47 AM | 6,277 | signup.aspx.cs.txt |
| 09/03/2009 | 02:37 AM | 741 | signup.aspx.designer.cs.txt |
| 09/17/2009 | 08:35 PM | 6,175 | signup.aspx.txt |
| 03/10/2009 | 10:43 PM | 463 | Site1.Master.cs.txt |
| 05/19/2009 | 01:26 AM | 688 | Site1.Master.designer.cs.txt |
| 06/21/2009 | 05:49 AM | 1,883 | Site2.Master.cs.txt |
| 06/21/2009 | 05:48 AM | 888 | Site2.Master.designer.cs.txt |
| 09/02/2009 | 10:42 PM | 463 | store.aspx.cs.txt |
| 09/13/2009 | 02:46 PM | 487 | store.aspx.designer.cs.txt |
| 09/13/2009 | 02:46 PM | 277 | store.aspx.txt |
| 04/21/2009 | 03:27 PM | 1,146 | userinfo.cs.txt |
| 09/03/2009 | 08:00 AM | 2,536 | usermgmt.aspx.cs.txt |
| 09/03/2009 | 07:35 AM | 680 | usermgmt.aspx.designer.cs.txt |
| 09/03/2009 | 06:15 PM | 2,183 | usermgmt.aspx.txt |

II. BACKGROUND OF THE INVENTION

A. Field of the Invention

The Invention relates to the secure storage and retrieval of information using a biometric identifier and a computer network such as the Internet or an intranet. The Invention has particular application for the secure storage and retrieval of large quantities of confidential information by multiple users in diverse computing and security environments.

B. Description of the Related Art

The implementation of modern information technology in high security environments requires that confidential information be stored and shared among multiple users using multiple platforms in multiple locations and in environments having diverse security precautions. Electronic access to medical records of a patient by various health care providers and insurers is one example. Another example comprises the distributed use of confidential records of law enforcement agencies such as the Federal Bureau of Investigation or security agencies such as the Department of Homeland Security or the Central Intelligence Agency.

Confidential records may be encrypted to prevent unauthorized access to those records using a private key encryption system. A private key system suffers the vulnerability that theft of the key coupled with theft of the encrypted files renders the confidential files open to a person of bad intent. Such a loss of both the encrypted file and the decryption key may occur in a physical theft of a computer memory device, such as in a burglary or in a theft by a dishonest employee, or by a hacker penetrating the defenses of a computer on which both the encrypted file and the decryption key are stored.

Prior art data storage and delivery systems do not teach the secure data storage retrieval system and apparatus of the Invention.

III. BRIEF DESCRIPTION OF THE INVENTION

The Invention is an apparatus and method for the secure storage and retrieval of confidential information. A client computer under the control of a user communicates with a server computer under the control of a service provider over a computer network such as the Internet or an intranet. The client computer is operably connected to a biometric scanner such as a fingerprint scanner. The identity of the human user is verified to the client computer and to the server computer by the user providing a user name and a biometric identifier, the biometric identifier comprising the results of a biometric scan using the biometric scanner. A file is resident in client computer memory. Upon command by the user, the client computer generates a private key and encrypts the file using the private key. The client computer transmits the private key to the server computer, which stores the private key in private key computer memory. The client computer stores the encrypted file in encrypted file computer memory. The private key computer memory and the encrypted file memory are in different physical locations. The encrypted file computer memory may be associated with the client computer or may be at a different physical location than the client computer.

As used in this document, a 'client computer' means any computer under the control of a user that is operably connected to a biometric scanner and capable of communicating with a server computer over a computer network such as the Internet or an intranet. The term 'server computer' means any computer under the control of a service provider and capable of communicating with the client computer over the computer network.

As used in this document, the term "different physical location" means different street addresses or any other physical separation so that a physical invasion of the location in which the encrypted file computer memory is housed will not also be a physical invasion of the location where the private key computer memory is housed. While the private key and the encrypted file will reside temporarily in memory on the same client computer during encryption or decryption of the file, the temporary memory is overwritten and erased after the encryption or decryption operation is completed. The encrypted file and the private key are not stored in non-volatile memory on a single computer or at a single physical location.

To use the apparatus and method of the Invention, a user utilizing a client computer logs onto a computer network and navigates to a website controlled by a service provider or to an equivalent intranet location. The user registers with the service provider to become a registered user. To register, the user transmits from the client computer to the server computer a user name and biometric identifiers to identify the user. As used in this application, the term "biometric identifier" means a fingerprint scan provided by a fingerprint reader, an iris scan provide by an iris scanner, the results of a facial recognition scan, or any other electronic data file generated by an electronic scan of a body part of a user. The server computer associates the username and biometric identifiers with the user and approves the user as a registered user.

Upon registration, the registered user downloads a client-side application ("CSA"). The CSA is a computer program for installation on the client computer. The CSA is configured to communicate with the server computer and to encrypt and decrypt files when requested by a logged-on, registered, authorized user. The user installs the CSA on each client computer from which the user will encrypt and decrypt files.

To encrypt or decrypt records, the user launches the CSA on the client computer and logs on to the server computer over the computer network. During logon, the user will provide the user name and biometric identifier such as a contemporaneous fingerprint scan. The server computer will compare the user name and fingerprint scan against the registration information of the user. If the user name matches and if the server computer concludes that the fingerprint scan is of the same person as the biometric identifiers stored in the server computer memory, then the server computer will recognize the user as a registered user and allow the registered user to log on.

To encrypt a file, the logged-on registered user will designate a file to the CSA and command the CSA to encrypt the file. The CSA will assign a private key to the file and encrypt the file using the private key. The CSA will apply conventional private key encryption algorithms to select the private key and to encrypt the file. The CSA transmits the private key to the server computer along with information to associate the private key with the encrypted file for subsequent decryption. The information to associate the private key with the file may include the user name and the date and time of the encryption.

The logged-on, registered user who commands the CSA to encrypt the file is the 'owner' of the encrypted file. The owner of the encrypted file can designate that one or more other registered users have permission retrieve the private key from the server computer and decrypt the encrypted file. A designation of another registered user to retrieve the private key and decrypt the encrypted file is referred to herein as 'a permission.' The registered user can grant a permission to individuals, groups or companies, such as a group consisting of a designated subset of employees of a hospital or a company consisting of members of a law enforcement task force.

The client computer transmits the permission to the server computer, which associates the permission with the encrypted file and stores the permission in server computer memory. The 'owner' of the encrypted file always has a 'permission' and always can request the private key and decrypt the encrypted file. When a permission is granted to another registered user who is not the owner, the permission is effective for a single retrieval of the private key and a single decryption of the file, but may be configured for multiple uses. Permissions also may be for a specified duration and expire or become inactive at the end of the specified period. The permission of the owner does not expire and continues indefinitely.

To decrypt the encrypted file, the user must be registered, logged-on to the server and be the owner or otherwise have permission to open the file. The user will select the encrypted file and will command the encrypted file to open. The CSA will communicate with the registration server and receive verification from the server that the user attempting to decrypt a selected file is the owner of the encrypted file or is a registered user given permission by the owner to unlock or decrypt the encrypted file and that the permission is still in effect. The CSA will retrieve the private key from the server computer and will decrypt the file using the private key. The CSA then will erase the private key from temporary memory of the client computer. The user may then open the decrypted file in the conventional manner and access the information contained in the original file and save, copy, edit or otherwise manipulate the file.

For example, if the decrypted file is a word processing document, the user may edit the decrypted document using a conventional word processing program. To save the file after editing, the user will command the CSA to save the file. The CSA will repeat the process of creating a private key, encrypting the file using the private key, saving the encrypted file, transmitting the private key to the server computer, and erasing the private key from temporary memory of the user's client computer. The server computer will save the private key along with along with information to associate the private key with the encrypted file for subsequent decryption Each registered user is provided with an automatically-generated personal web page. Each time the user saves a file in encrypted form, the user is the 'owner' of the encrypted file and the encrypted file is identified on the user's personal web page. The user's personal web page also displays the permissions that the user has set for the file and allows the user to change those permissions. When the user saves a file in encrypted form, the personal web page of each user who has permission to open the file displays a notification that a permission has been granted by the owner of the file. The notification provides information specific to the file, including the name of the file, the owner of the file, time and date permission was issued, when the permission is active, when the permission expires and any notes that the owner may have attached to the encrypted file.

When any registered user with permission opens the file, the access is recorded by the server and a log of that access may be viewed on the personal web page of the user who exercised the permission as well as the file 'owner' who granted the permission. The log and other information displayed by the personal web page also may be displayed to the owner or the user with permission by the CSA running on the client computer.

The personal web page of any registered user may be viewed from any Internet-enabled device upon entry of a username and password without entry of a biometric identifier and without decrypting any file. This allows the registered user or a person having responsibility for information security to monitor access to files from any device, including devices not having the capability to provide a biometric scan.

The CSA may provide the user with the option of saving the encrypted file remotely from the client computer. The encrypted file may be transmitted in encrypted form over the network and saved to an encrypted file computer memory at a different location from the client computer and from the server computer storing the private key for that file.

IV. BRIEF DESCRIPTION OF THE DRAWINGS

Figure 5:
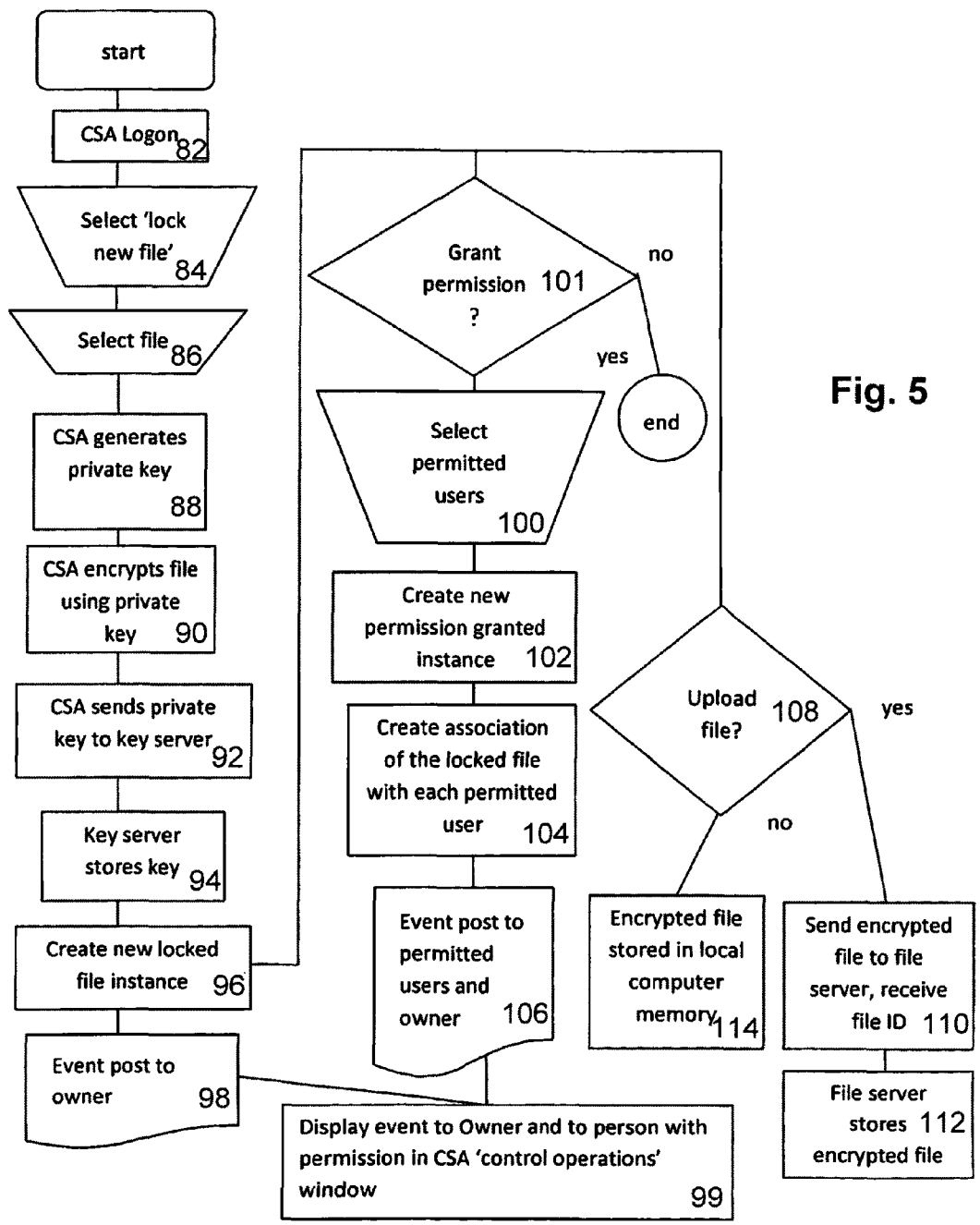

FIG. 5. is a flow chart of the process of encrypting a file.

Figure 6:
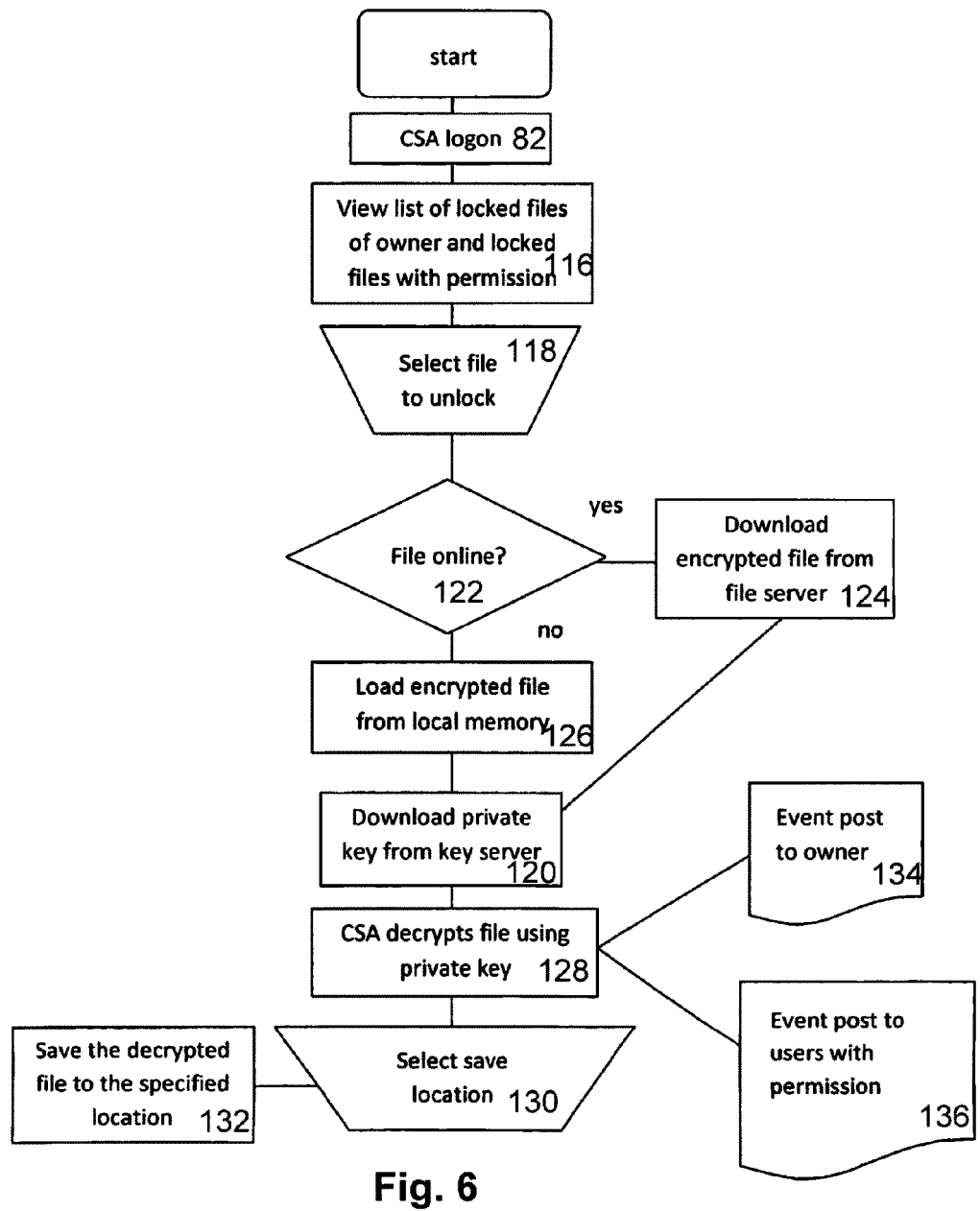

FIG. 6 is a flow chart of the process of decrypting the file.

Figure 9:
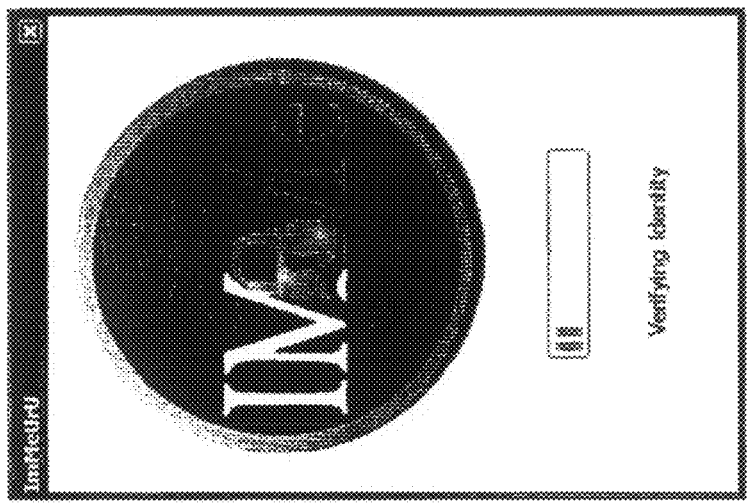
Figure 8:
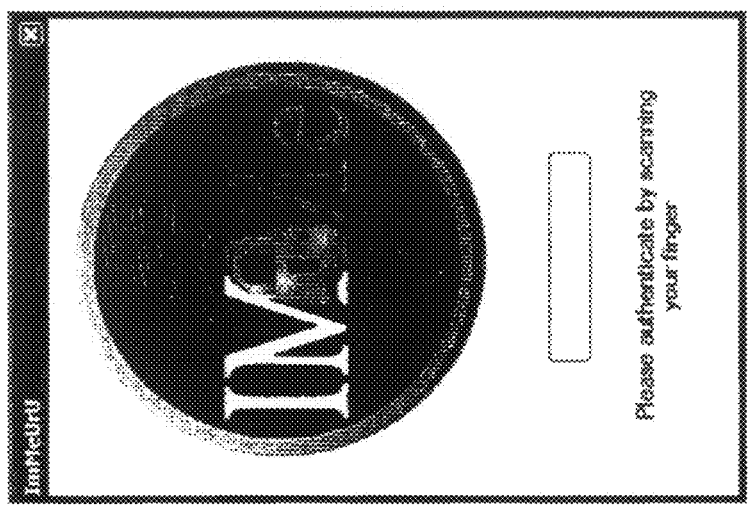
Figure 7:
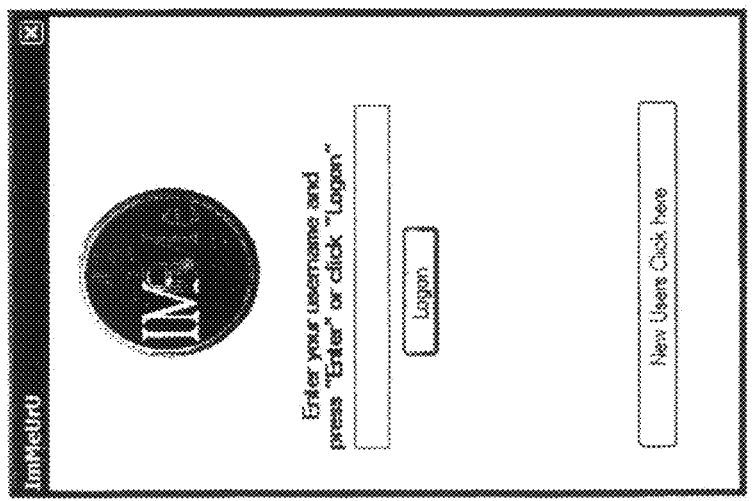

FIG. 7-9 are images of screens presented during the CSA logon process.

Figure 10:
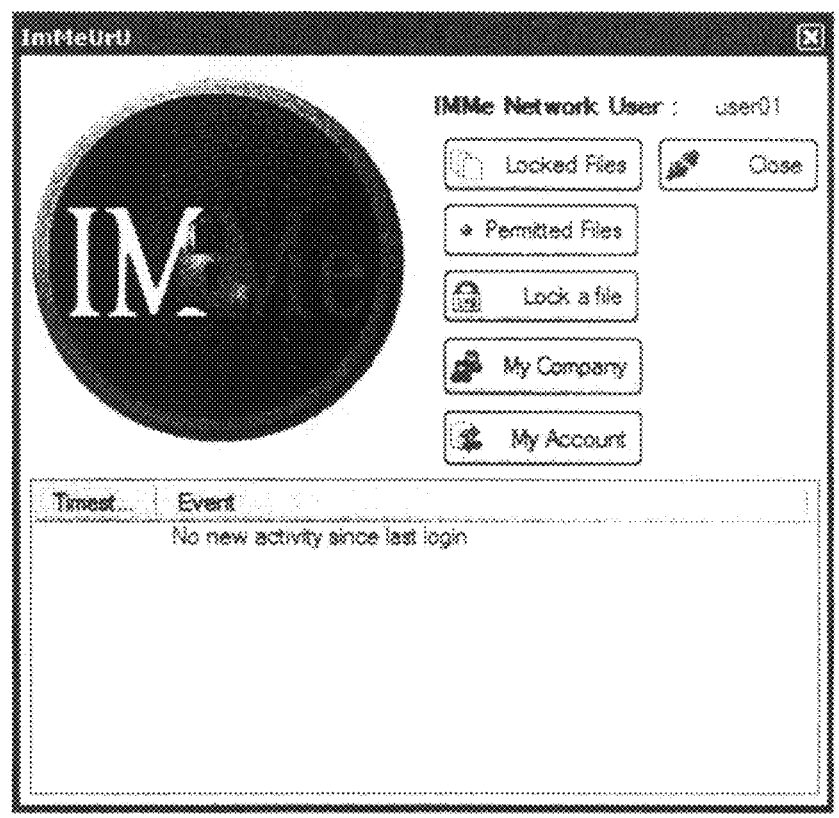

FIG. 10 is an image of the CSA control operations window presented to a logged-on, registered user.

Figure 11:
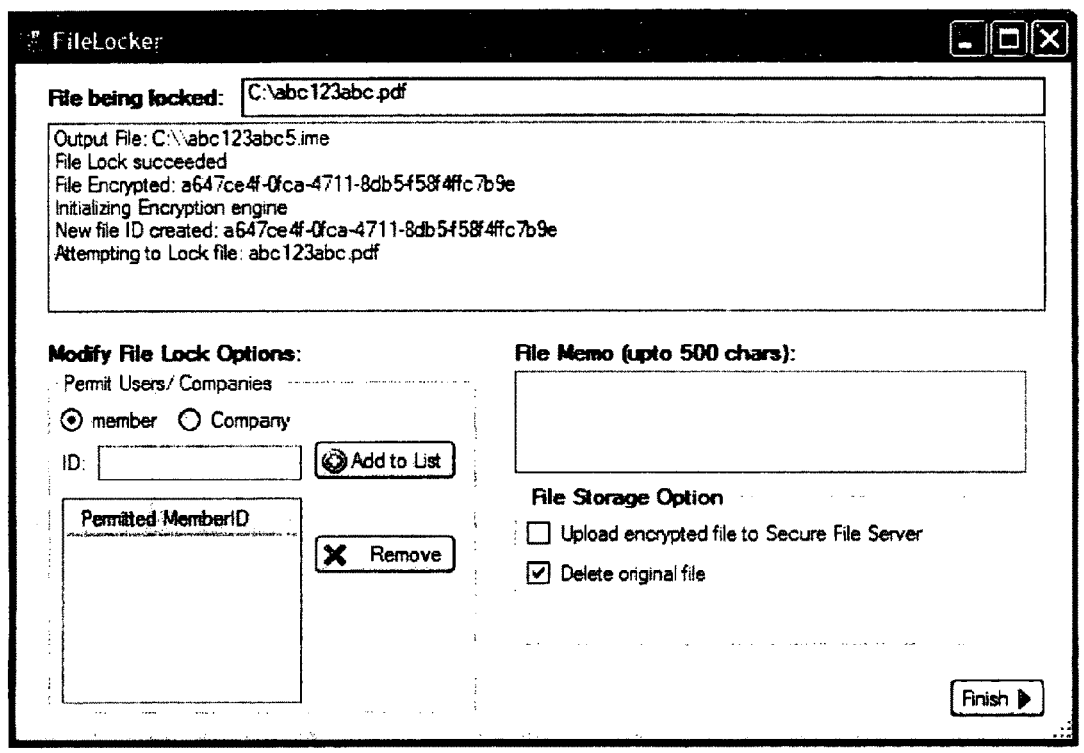

FIG. 11 is an image of the lock file screen.

Figure 12:
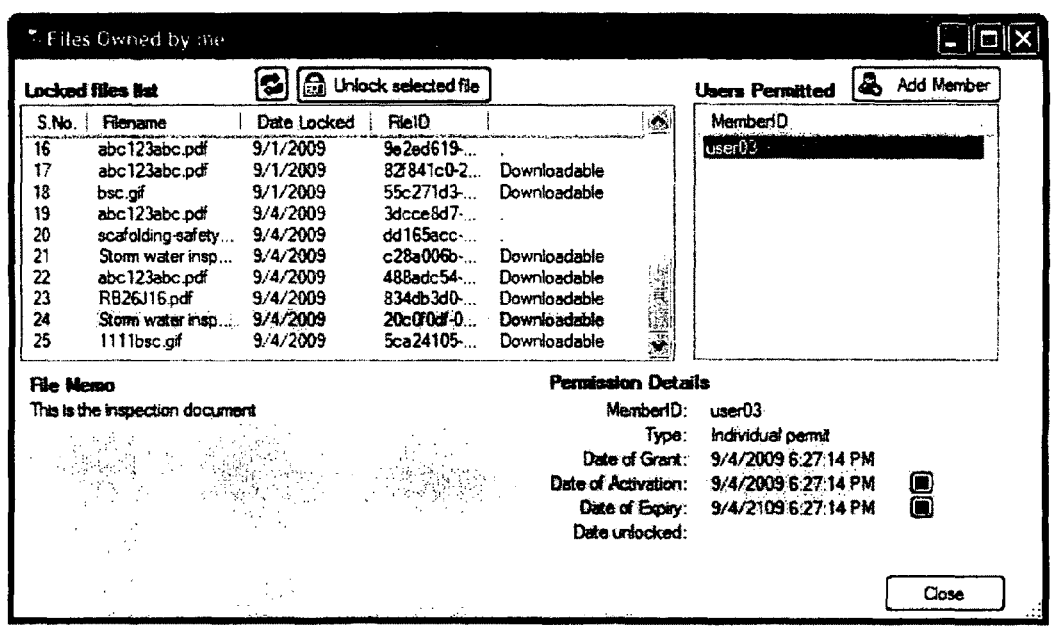

FIG. 12 is an image of files owned by me screen.

FIG. 13 is an image of files permitted to me screen.

FIG. 14 is an image of the CSA operations window after an event is posted to the event information list.

V. DESCRIPTION OF AN EMBODIMENT

Figure 1:
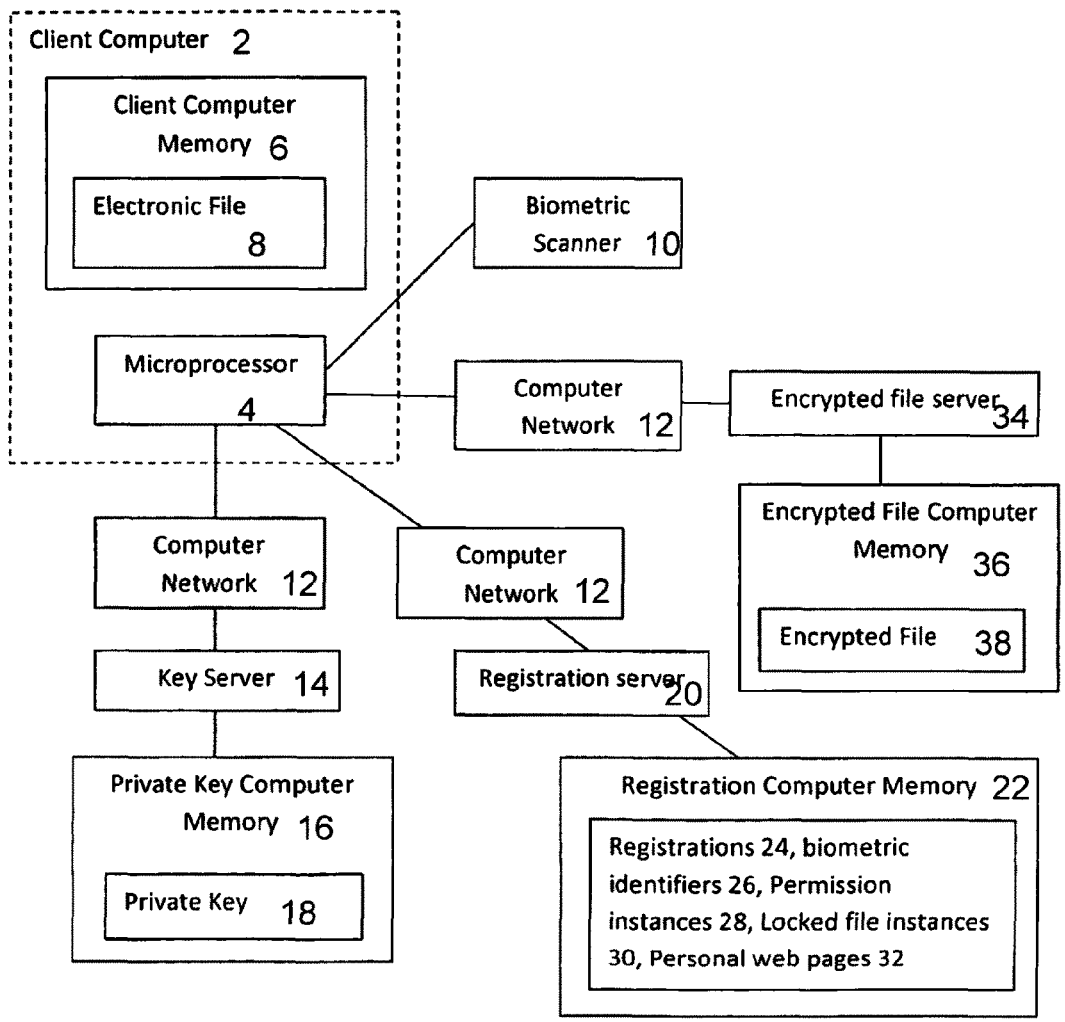
FIG. 1 is a block diagram of the system architecture.

The Invention is an apparatus and method for securely storing and retrieving confidential information. FIG. 1 is a block diagram of the system architecture. A client computer 2 is operated by a human user. The client computer 2 includes a microprocessor 4 and a client computer memory 6. The client computer memory 6 is accessible to the microprocessor 4. The client computer memory is capable of storing an electronic file 8. The electronic file 8 contains the confidential information that will be securely stored and retrieved by the system. A biometric scanner 10 is connected to the microprocessor 4. The biometric scanner 10 is capable of scanning a body part of the human user to generate a biometric identifier 26. The biometric scanner 10 may be a fingerprint scanner, an iris scanner, a facial recognition scanner or any other scanning device capable of generating an electronic file that is unique to a human user and requires the presence of the human user to perform the scan. The biometric identifier 26 is an electronic file that contains the results of the biometric scan.

The client computer is capable of communicating with other computers over a computer network 12. The computer network 12 may be the Internet or an intranet or may be any other network of computers capable of communicating one with another.

A key server 14 is connected to the microprocessor 4 of the client computer 2 over the computer network 12. The key server 14 is connected to a private key computer memory 16. Private key computer memory 16 is accessible to the key server 14. Private key computer memory 16 is capable of storing a private key 18. Private key 18 is a private encryption key as the term is commonly used in the encryption art.

A registration server 20 is attached to microprocessor 4 over the computer network 12. The registration server 20 also is connected to the key server 14 over the computer network 12. The registration server 20 is connected to a registration server computer memory 22. The registration server computer memory is capable of storing registration status 24 of the human users, biometric identifiers 26 for the registered users, permissions 28 granted by a user, locked file instances 30, and information to construct a personal web page 32 for each registered user, as those terms are hereinafter used and defined.

An encrypted file server 34 communicates with the client computer 2 and the registration server 20 over the computer network 12. An encrypted file computer memory 36 is connected to and in communication with the encrypted file server 34. The encrypted file computer memory 36 is capable of storing an encrypted file 38.

The registration server 20 and the encrypted file server 34 may be separate servers or may be one server that serves the functions of both the encrypted file server 34 and the registration server 20. The encrypted file server 34 and the key server 14 are not the same server. Encrypted file computer memory 36 is in a different physical location (as previously defined) from private key computer memory 16. Maintaining encrypted file computer memory 36 and private key computer memory 16 at different physical locations prevents the toss of both an encrypted file 38 and the private key 18 to unlock that encrypted file 38 in a single action of physical thievery or a single incident of hacking.

Figure 2:
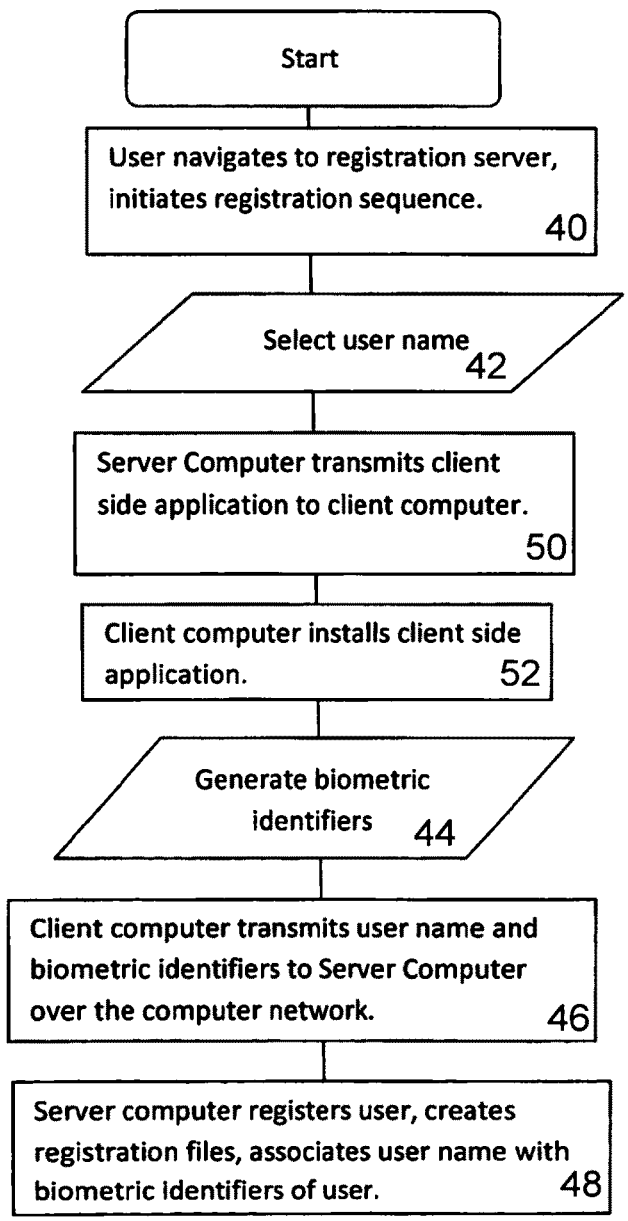
FIG. 2 is a flow chart of the registration process.

FIG. 2 is a flow chart illustrating the registration process to transform a user into a registered user authorized to securely store and retrieve files using the apparatus and method of the Invention. A human user utilizing client computer 2 navigates through the computer network 12 to the registration server 20, illustrated as item 40. The registration server 20 will request, and the user will select, a user name, which the microprocessor 4 of client computer 2 transmits to registration server 20 over computer network 12, shown by item 42 of FIG. 2.

During the registration process, the registration server 20 will transmit a Client Side Application ("CSA") to the client computer over the computer network 12, as shown by item 50. The client computer will install the CSA, as shown by item 52. The CSA is a computer program resident in client computer memory 6 that automates many of the encryption, decryption and communications functions of the apparatus and method of the Invention. The CSA also provides gatekeeper functions in allowing or refusing access by the user to the registration server 20, key server 14 and encrypted file server 34.

The registration server 20 will request a biometric identifier 26. The user uses biometric scanner 10 to scan a body part of the user, for example the user's fingerprint, as illustrated by item 44. The microprocessor will transmit the biometric identifier 26 to the registration server 20, as shown by item 46. The registration server 20 will create a registration account for user, transforming user into a registered user and as shown by item 48. The registration server 20 will associate the user name and the submitted biometric identifiers 26.

The registered user may be an individual. Alternatively, a group or company may be registered comprising more than one individual under the control of a chairman. Where a group or company comprises more than one individual, each individual nonetheless will provide biometric identifiers, which may be one or more scans of a body part of the individual by biometric scanner 10. The biometric identifier and username of each person in the group or company will serve to allow each group member or company employee to identify him or herself to the registration server 20 to allow access to encrypted files 38 and private keys 18. The chairman of the group or company can determine access limitations of individual members of the group or employees of the company.

The processes of encrypting and decrypting a file using a private key 18 are also referred to in this document as 'locking' and 'unlocking' the file. 'Locking' means 'encrypting.' 'Unlocking' means 'decrypting.' An encrypted file 38 is also referred to as a 'locked file' 38 while a unencrypted electronic file 8 is referred to as an 'unlocked file' 8.

Figure 3:
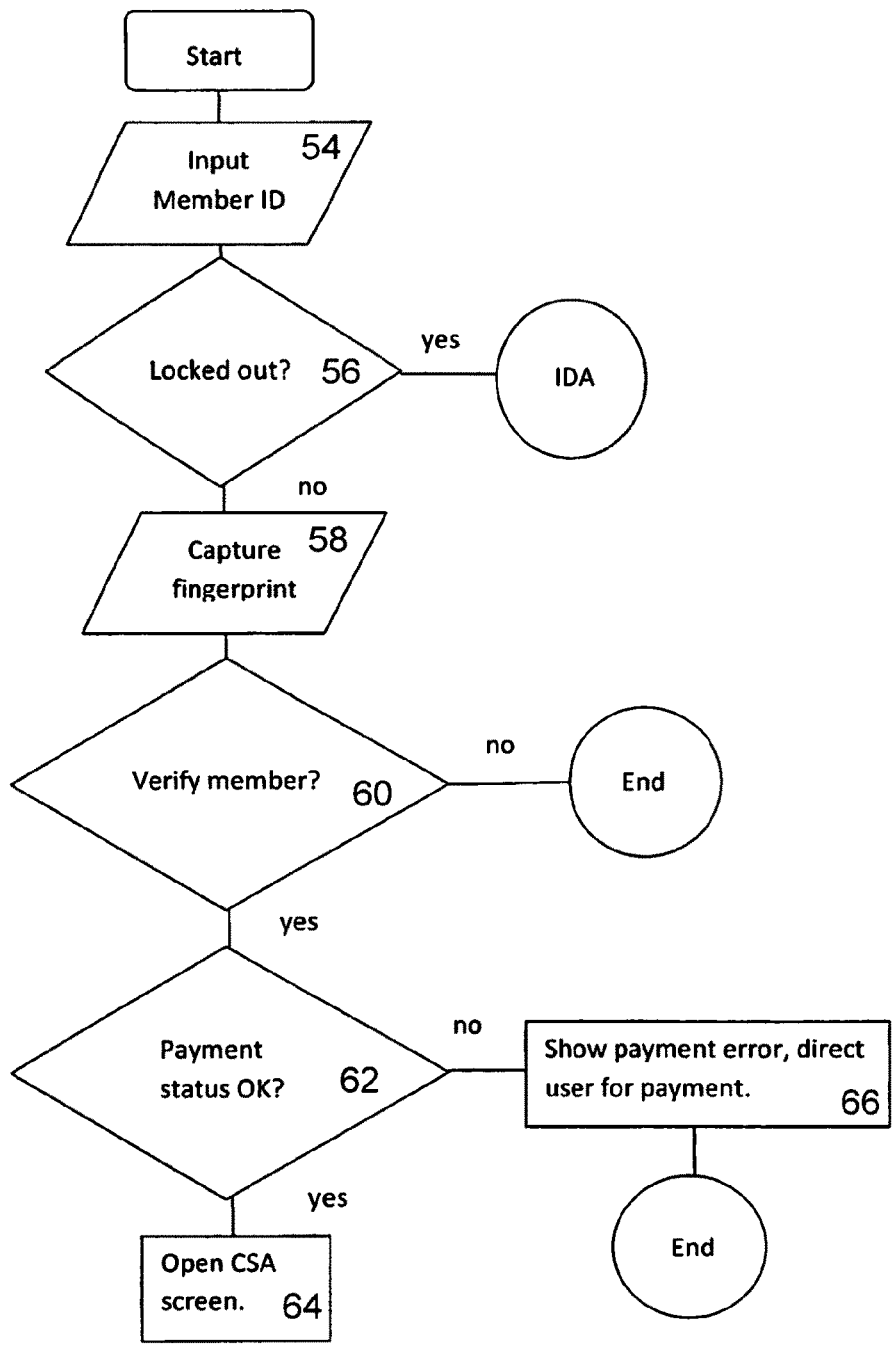
FIG. 3 is a flow chart of the Client Side Application ('CSA') logon process.
Figure 4:
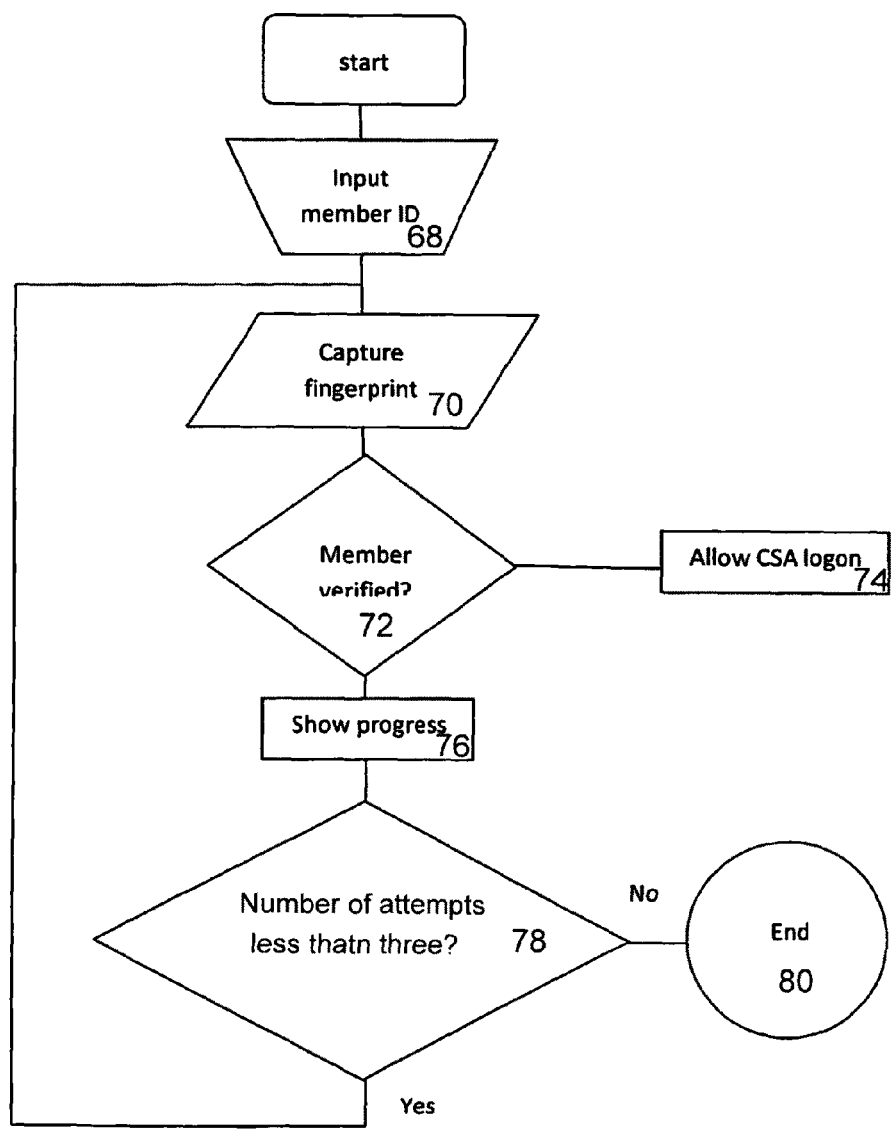
FIG. 4 is a flow chart of the IDAV process.

To access the encryption and decryption functions of the apparatus and method, the user logs on to the CSA resident on the client computer 2. FIG. 3 is a flow chart illustrating the CSA logon process. To log on to the CSA, the registered user will open the CSA (client side application) on the client computer 2. The registered user will input the user's member ID, also referred to herein as the 'user name,' indicated as item 54 on FIG. 3. The CSA will consult with the registration server 20 over computer network 12 to determine whether the user is 'locked out,' item 56 of FIG. 3. If the CSA receives notice from the registration server 20 that the registered user is 'locked out,' the CSA will require the user to go through the identification process shown by FIG. 4. The registration server 20 might lock out a registered user for non-payment, for activity on the user's account that may indicate a security breach, or for any other reason.

If the user is not 'locked out,' the CSA will request that the registered user provide a biometric identifier 26, which may be a fingerprint, as illustrated by item 58 of FIG. 3. The registered user will place his or her finger on a biometric scanner 10, which will scan the body part of the user. The client computer 2 will generate a biometric identifier 26, which the client computer 2 will transmit to the registration server 20 over the computer network 12. The registration server will verify the identity of the user, item 60 of FIG. 3, by comparing the biometric identifier 26 received from the client computer 2 to the biometric identifier 26 associated with the user's user name in registration computer memory 22. If the registration server 20 concludes that the biometric identifier 26 received from the client computer 2 is from the same person as the biometric identifier 26 stored in registration computer memory 22 and associated with the user's user name, the registration server 20 will conclude that the registered user is who he or she claims to be.

The registration server 20 also will check the payment status 62 of the registered user. If the user is the registered user who he or she claims to be and if the payment status is adequate, then the CSA will display the CSA Control Operations Window and information field screen to the registered user, item 64 of FIG. 3 and as illustrated by FIGS. 10 and 14, to allow the registered user to encrypt and decrypt files. If the payment status is not adequate, the CSA will so indicate to the registered user, shown by item 66 of FIG. 3, and not allow access to the CSA screen by the registered user.

If the initial logon to the CSA is not successful in matching the user name to the biometric identifier 26 stored in the registration computer memory 22, or if an inaccurate member name was entered on a third failed attempt, the application will 'auto-quit' and close. If inaccurate member name and password information is entered when attempting to log into the personal web page 32 on a third failed attempt the members account is 'locked' and the user is referred to the 'IDAV' identification process illustrated by FIG. 4. In the process illustrated by FIG. 4, the user for whom the biometric identifier 26 and user name did not match is given two more attempts to logon. The user will re-input the user's username, indicated by item 68 of FIG. 4. The user submits another biometric identifier 26, such as a fingerprint scan, from item 70 of FIG. 4. The use may submit a fingerprint scan for a finger different from first attempt. If the user name and biometric identifier 26 match those stored in the registration computer memory 22, from item 72 on FIG. 4, then the user is allowed to logon to the CSA, item 74 of FIG. 4. If the user name and biometric identifier 26 do not match, the number of attempts is exhibited to the user, item 76 of FIG. 4. If the CSA counts fewer than three attempts to logon, the CSA allows the user to try again, item 78 of FIG. 4. If the number of attempts equals three, the user is locked out, item 80 of FIG. 4.

FIG. 5 illustrates the process for encrypting an electronic file 8 and storing the encrypted file 38. A registered user logs on to the CSA (client side application) resident on the client computer 2, as described above for FIGS. 3 and 4, item 82 of FIG. 5. The logged-in registered user is presented with the CSA control operations window, shown by FIGS. 10 and 14, which gives the user options to encrypt or to open a file. The user selects 'lock a file,' item 84 of FIG. 5. The user locates the electronic file 8 that the user wishes to encrypt and securely save; that is, which the user wishes to 'lock.' The user selects the file, item 86 of FIG. 5, and commands the CSA to lock the file.

Upon receiving the 'lock' command for the electronic file 8, the CSA generates a private key 18, item 88 of FIG. 5. The private key 18 is generated by conventional private key encryption software that is a part of the CSA. The CSA proceeds to encrypt the electronic file 8 using the private key 18 and the conventional private key encryption software to create an encrypted file 38, from item 90 of FIG. 5. The CSA transmits the private key 18 over the computer network 12 to the key server 14, which stores the private key, from items 92 and 94 of FIG. 5.

The CSA notifies the registration server 20 of the creation of the encrypted file 38, which notes a 'new locked file instance' 30, from item 96 of FIG. 5. As used in this document, an 'instance' is an event the occurrence of which is logged and that triggers actions by the CSA, the registration server 20 or both. The event that is logged in item 96 is the encryption of the electronic file 8 to create the encrypted file 38. The actions that are triggered by the 'new locked file instance' 30 include posting the event as a log entry to the personal web page 32 of the registered user who locked the electronic file 8, from item 98 of FIG. 5. The triggered actions also include posting the event to the events list displayed to the user by the CSA, item 99 from FIG. 5, in the control operations window shown by FIGS. 10 and 14.

The personal web page 32 of the user is generated by the registration server 20. As described above, the personal web page 32 of the registered user is displayed to the registered user when the registered user logs on to the CSA and selects the 'my account' button of the control operations window, shown by FIG. 10, or when the user accesses the personal web page 32 from any internet enabled device and enters their member name and password accurately. The personal web page 32 identifies the encrypted files 38 that the user has locked and also the other encrypted files 38 that the user has permission to unlock. The log of the personal web page 32 also will display to the user other events relating to encrypted files 38 of the registered user, such as encryption and decryption activities of persons to whom the registered user has given permission to unlock the files. The log will record all other actions and events specific to the user's member account including decisions regarding the user's request to join a company as well as security alerts, account payment status and changes in employee and membership status. Membership status may change due to payment requirements, suspensions or being 'locked out' of the user's account.

Upon creation of the new locked file instance, item 96 of FIG. 5, the registered user is provided the opportunity to designate other persons, groups or companies to whom the registered user will grant a 'permission,' from items 101 and 100 of FIG. 5. As used in this document, a 'permission' is a grant of authority to another registered user to retrieve the private key from the key server and unlock the encrypted file 38. If the encrypted file 38 is stored on a remote encrypted file server 34, the permission may allow the user with permission to download the encrypted file 38 from the encrypted file server 34. The 'owner' is the person who encrypted the file or who is otherwise designated as the owner at the time that the original file is 'locked' and the encrypted file 38 is created. The owner may grant the 'permission' to a registered user who is an individual, such as a doctor, to a group, such as the group of employees of the billing department at a hospital, or to a company, such as an insurance company or government agency. The owner also may define specific parameters of the permission, such as the date and time when the permission will become active or expire.

When the user selects other registered users who will have 'permission,' the designation of those persons is an 'instance,' as previously defined. The client computer 2 informs the registration server 20 of this 'permission instance 28,' from item 102 of FIG. 5. The event recorded is the designation of another registered user to be authorized to access the private key and unlock the encrypted file 38. The action taken by the registration server 20 in response to the permission instance 28 is that the registration server 20 creates an association between each registered user with permission and the encrypted file 38, as indicated by item 104 of FIG. 5, allowing the registered users with permission to lock the designated encrypted file 38. The registration server 20 also posts the event to the personal web page 32 of the file owner who locked the file in addition to a notice that is posted on the personal web page 32 of each registered user who is granted permission, item 106 of FIG. 5.

When any registered user with permission logs on to the CSA the event list located at the bottom of the control operation window illustrated by FIGS. 10 and 14 lists all events, actions and activities specific to the user's account that have occurred since the user last ran the application. The personal web page 32 of both the owner as well as the registered user with permission lists the date, time, owner and notice that permission was granted to decrypt or 'unlock' the encrypted file 38. The locked file name will also appear in the CSA under the 'Files Permitted to Me' screen illustrated by FIG. 13 of the registered user with permission and allows the registered user with permission to retrieve the private key and unlock the encrypted file 38.

Upon creation of the new locked file instance, item 96 of FIG. 5, the registered user also is provided the opportunity to upload the encrypted file 38 to a separate encrypted file server 34, as indicated by item 108 of FIG. 5. If the registered user elects to upload the file, the CSA notifies the registration server 20 and transmits the encrypted file 38 to the encrypted file server 34, which stores the encrypted file 38 in encrypted file computer memory 36.

If the registered elects not to upload the encrypted file 38, the registered user selects another location to which to save the encrypted file 38. The registered user saves the encrypted file 38 to the selected location, as indicated by item 114 of FIG. 5. The selected location may be the client computer memory 6 or may be any other electronic memory, such as a flash drive, portable hard drive or a local or wide area computer network memory.

FIG. 6 illustrates the step of unlocking (decrypting) an encrypted file 38 so that the information in the encrypted file 38 may be used. The registered user first completes the CSA logon procedure of item 82 of FIG. 6. Upon logon, the user may direct the CSA to display a list of the encrypted files 38 owned by the user and a list of the encrypted files 38 for which the user has been granted 'permission,' as discussed above and as illustrated by item 116 of FIG. 6. The lists are generated in real time by the registration server 20. The locked files 38 are designated by the file title name followed by an '.ime' suffix. The original format or file type of the encrypted files 38 is hidden and unavailable until such time as the encrypted file 38 is 'decrypted' or unlocked.

The CSA event list located at the bottom of the control operation window illustrated by FIGS. 10 and 14 displays each 'instance,' as defined above, for each of the encrypted files 38 for which the registered user is the owner or has been granted permission. The registered user therefore can see each occurrence in which any encrypted file owned by the registered user or for which the registered user has permission has been locked or unlocked and the identity of the user locking or unlocking the file.

To unlock an encrypted file 38, the registered user will select an encrypted file 38 of which the registered user is the owner or for which the registered user has been given permission by the owner to decrypt the encrypted file 38, indicated as item 118 on FIG. 6. The CSA will send a request for the private key 18 and will receive the private key 18 from the key server over the computer network 12. The request by the CSA is directed to the registration server 20, which then coordinates delivery of the private key 18 from the key server 14 to the microprocessor 4 of the client computer 2. Alternatively, the CSA may send the request directly to the key server 14. The client computer 2 will download and utilize the private key 18 using RAM memory, from item 120 of FIG. 6.

If the encrypted file 38 is stored on a separate encrypted file server 34, the CSA will request delivery of the encrypted file 38, from item 122 of FIG. 6. The CSA's request for the encrypted file may be directed to the registration server 20, which then will coordinate delivery of the encrypted file. Alternatively, the request may be directed to the encrypted file server 34. The CSA will download the encrypted file 38 to the client computer 2, as illustrated by item 124 of FIG. 6, and will store the encrypted file in temporary memory.

If the encrypted file 38 is not stored on a separate encrypted file server 34, registered user locates the encrypted file 38 on client computer memory 6, or on whatever other memory the encrypted file 38 is stored, and commands the encrypted file 38 to open, indicated by item 126 on FIG. 6.

The CSA running on the client computer 2 decrypts the encrypted file 38 using private key 18, indicated by item 128 of FIG. 6. The registered user will select a save location for the resulting electronic file 8, which is now decrypted, and will save the electronic file 8 to that save location, from items 130 and 132 of FIG. 6. The client compute 2 will then allow the registered user to open the decrypted file 8. The client computer 2 also will erase the private key 18 and encrypted file 38 from temporary memory.

The decryption of the encrypted file 38 is an 'instance,' as defined above. The event to be recorded is the decryption of the encrypted file 38. The registration server 20 posts notice of the event to the owner of the encrypted file 38 and to the user having permission to unlock the encrypted file 38, as indicated by item 134 of FIG. 6. When the owner of the encrypted file or when any registered user having permission logs on to the CSA or logs into their personal web page 32, a list of all lock and unlock activities of each encrypted file 38 is available to the owner and to the registered user having permission to decrypt the encrypted file 38.

Of course, there may be many client computers 2, each running the CSA, and many registered users. The functions of the registration server 20 may be distributed or divided among multiple servers. The only limitation on the physical arrangement of the servers 14, 20, 34 and of the functions of the servers 14, 20, 34 is that the private key 18 and the encrypted file 38 associated with that private key 18 will not be stored in the same server 14, 20, 34 or in the same physical location, to prevent vulnerability to physical theft and to prevent toss of both the encrypted file 38 and the encryption key 18 in a single instance of hacking.

Communications among the client computer 2, the registration server 20 and the key server 14, and the encrypted file server 34 over the computer network 12 are secure communications using conventional https secure socket technology as currently used for Internet financial transactions. In https technology for Internet communications, a public key encryption system encrypts a communication that is then transmitted over the computer network 12. The recipient of the communication decrypts the communication for use. The file is encrypted while in transit, but is in decrypted form in both the transmitting and receiving computers. This https encryption of communications among the client computer 2 and servers 14, 20, 34 is distinct and different from the private key 18 encryption used to lock the encrypted file 38. The encrypted file 38 is encrypted using the private key 18. As described above relating to FIGS. 5 and 6, once locked, the encrypted file 38 remains locked until the encrypted file 38 and the encryption key 18 are reunited in the client computer 2 by a command of a logged-on, registered user who is either the owner of the encrypted file 38 or a person with permission to unlock the encrypted file 38.

FIGS. 7-14 are selected screen shots of the CSA running on the client computer 2. FIGS. 7-9 are the screens presented during logon. The CSA running on the client computer 2 first presents the screen of FIG. 7 to the user seeking to logon. The user is prompted for a user name and clicks 'logon.' As shown by FIG. 8, the CSA then prompts the user to scan his or her finger using the fingerprint scanner 10 attached to the client computer 2. The CSA causes the client computer 2 to transmit the user name and biometric identifier 26 generated by the fingerprint scan to the server computer 20 over the network 12, while displaying the screen of FIG. 9 to the user.

Upon receiving verification from the server computer 20 that the user is the registered user that he or she claims to be, the CSA displays the control operations window illustrated by FIG. 10 to the registered, logged-on user. The control operations window of FIG. 10 allows the registered user to, among other things, select 'Lock a File,' 'Locked Files,' 'Permitted Files,' 'My Company', and 'My Account.' Selecting 'My Account' launches a browser and connects the registered, logged-on user to his or her personal web page 32.

Upon selecting 'Lock a File' in the CSA control operations window of FIG. 10, the user is provided an opportunity to select an unencrypted electronic file 8 from client computer memory 6 or from any other location. Once the user selects the electronic file 8 to lock, the CSA presents the registered user with the 'File locker' screen of FIG. 11. The File Locker screen of FIG. 11 allows the user to add permissions for other registered users, whether individuals, groups or companies, to have permission to access and retrieve the private key 18 and unlock the encrypted file 38. The File Locker screen of FIG. 11 gives the user the option to upload the encrypted file 38 to the encrypted file server 34 for remote storage of encrypted file 38. The File Locker screen also allows the user to select that the original unencrypted file 8 will be securely erased, increasing security by preventing physical theft or hacking of the original, unencrypted file 8. The File Locker screen identifies the encrypted file 38 to the user and also allows the user to attach a memo to the encrypted file 38 which will be visible and accessible to the owner and the permitted unlock member.

If the registered user selects the 'Locked Files' option from the CSA control operations window of FIG. 10, the user is presented with the 'Files Owned by Me' screen of FIG. 12. The 'Files Owned by Me' screen presents a list to the user of the encrypted files for which the user is also the 'owner.' As used in this document, the 'owner' of an encrypted file is the registered user who logged on to the CSA and directed the CSA to encrypt the file. Upon selecting one of the encrypted files 38 from the list, the 'Files Owned by Me' screen displays a list of all of the other registered users to whom the owner has granted permission to access the private key 18 and unlock the encrypted file 38. Highlighting a person having permission from the list causes the 'Files Owned by Me' screen to display the details of that permission and allows the owner to limit, restrict, modify or withdraw the permission. For example, the owner can specify the start date and time of the permission; that is, when the permission becomes 'active,' and can specify the end date and time of the permission; that is, when the permission will 'expire.'

The owner also may select a file from the 'Locked Files list' of the 'Files Owned by Me' screen of FIG. 12 and select 'Add Member.' The registered user can add the member names of individual registered users or can add the names of groups or companies to give permission to all the active company employees and current members of 'good standing' of the company or group to access the private key 18 associated with the encrypted file 38 and to unlock the encrypted file 38.

FIG. 13 is an image of the 'Files Permitted to Me' screen displayed by the CSA if the registered, logged-on user selects 'Permitted Files' on the CSA control operations window of FIG. 10. A list of encrypted files 38 for which the user is not the owner, but for which the user has been granted permission to access the private key 18 and unlock the encrypted file 38 is displayed to the user. The logged-on registered user may select an encrypted file 38 from the list of 'Files Permitted to Me' and may direct the CSA to decrypt the encrypted file 38. The CSA then will retrieve the private key 18 from the key server 14 and decrypt the file.

The logged-on registered user is authorized to decrypt and open encrypted files 38 for which the user is either the owner, as previously defined, or for which the user has been granted a permission by the owner of the encrypted file, as illustrated by FIGS. 12 and 13.

FIG. 14 is a screen shot of the control operations window of FIG. 10 after the encryption of an electronic file using the File Locker screen of FIG. 11. An event list on the control operations window displays the event that occurred and the time of the event. FIG. 14 illustrates the encryption of files. Other events also are displayed to the user, such as a grant of permission to the user and the unlocking of a file for which the user is the owner.

As an example, a user may be a private individual and the electronic file 8 may be a medical record of the individual. Under direction by the user, the CSA encrypts the medical record 8 to form an encrypted file 38. The user is the owner of the encrypted file 38 and has the power to determine who can decrypt and open the medical record 8. The owner always has permission to decrypt the encrypted file 38 and to thereby open the medical record 8. For this example, the owner grants permission to his or her primary physician, an individual, to decrypt the encrypted medical record 38 so that the physician can render treatment to the owner. The owner also grants permission to his or her insurance company so that the company can determine whether to pay for the treatment. Any authorized employee of the insurance company then can exercise the permission and decrypt the encrypted file 38. For this example, the primary physician wishes to consult with a specialist. The owner grants permission to a group consisting of the members of a specialist medical practice to decrypt the encrypted file 38. For the purposes of this example, the user wishes his physician to have unlimited access to the medical record, wishes for the insurance company to have access only until the coverage decision is made and wishes the specialist medical group to have access only during the period that they are providing their opinion. The user, as owner of the encrypted medical record 38, provides an unlimited permission to his primary care physician, provides a permission to the insurance company that expires in one month, and provides a permission to the specialist group that is open only for a specified two hour period on the date of the consultation.

The private key encryption program 'Blowfish' using a key size of 448 bits has proved successful in practice for private key encryption and decryption duties in the CSA. 'Blowfish' is an open source encryption program available at 'Blowfish.net.' The private key 18 is created using a random number generator.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

I claim:

1. A method for securely storing and retrieving confidential information, the method comprised of the following steps:
   a. a server computer under the control of a service provider and a client computer under the control of a user communicating over a computer network;
   b. using a biometric scanner device operably connected to said client computer to generate a biometric identifier of said user;
   c. transmitting said biometric identifier over said computer network for storage in said server computer memory to enroll said user as a registered user;
   d. creating a user webpage for said registered user that can be accessed from any internet enabled device;
   e. transmitting a second biometric identifier to said server computer and matching it with said stored biometric identifier of said user to authenticate the identity of said registered user;
   f. generating a private encryption key in the virtual memory of said client computer and encrypting an electronic file using private key encryption to create an encrypted file;
   g. said client computer transmitting said private encryption key to a private key server upon the encryption of said electronic file;
   h. uploading said encrypted file to an encrypted file server having a different street address and different physical location from said private key server, whereby a single incident of hacking or burglary at a single physical location will not result in a theft or compromise of both said encrypted electronic file and said private encryption key; and erasing and overwriting said virtual memory;
   i. posting a listing on said user webpage of the encryption of said electronic file that on selection downloads said encrypted file and said private encryption key to the virtual memory of said client computer and decrypts said electronic file;
   j. upon the decryption of said encrypted file said client computer erasing and overwriting said virtual memory and displaying said electronic file.

2. The method of claim 1, wherein the method further comprises;
   a. the encrypted file owner grants a permission authorizing a permitted registered user to retrieve said private encryption key and decrypt said encrypted file;
   b. posting on the user webpage of said encrypted file owner and the user webpage of said permitted registered user a notification of the granting of said permission that contains a link to said encrypted file;
   c. a second client computer transmitting a biometric identifier of said permitted registered user over said computer network that is matched with a biometric identifier stored in the memory of said server computer and authenticating the identity of said permitted registered user;
   d. selecting the link to the encrypted file by said permitted registered user, wherein said encrypted file is downloaded and said private encryption key is retrieved to the virtual memory of said second client computer under the control of said permitted registered user and said encrypted file is decrypted;
   e. upon the decryption of said encrypted file, said virtual memory of said second client computer is erased and overwritten and said decrypted file is displayed;
   f. a notification of the decryption of said encrypted file is posted on the user webpage of said permitted registered user and the user webpage of said encrypted file owner.

3. A system for the storage and retrieval of confidential information, said system comprising;
   a. a client computer, said client computer being under the control of a user;
   b. a server computer, said server computer being under the control of a service provider, said server computer configured to communicate with said client computer over a computer network;
   c. a biometric scanner, said biometric scanner operably connected to said client computer, said biometric scanner configured to generate a biometric identifier of said user, said client computer configured to transmit said biometric identifier over said computer network to said server computer, said server computer configured to store said biometric identifier to enroll said user as a registered user;
d. a user webpage, said user webpage being generated for said registered user is viewable by any internet enabled device;
e. an electronic file, said electronic file being accessible to said client computer;
f. a virtual memory, said virtual memory being operably connected to said client computer, said virtual memory being configured to generate a private encryption key and encrypt said electronic file using private key encryption to create an encrypted file;
g. a private key server, said private key server configured to communicate with said client computer over said computer network, upon the encryption of said electronic file said client computer configured to transmit said private encryption key to said private key server;
h. an encrypted file server, said encrypted file server residing at a different physical location from said private key server said client computer further configured to upload said encrypted file to said encrypted file server and erase and overwrite said virtual memory, wherein said encrypted file and said private encryption key are not stored on the same computer or at the same location; whereby a single incident of hacking or burglary at a single physical location will not result in a theft or compromise of both said encrypted electronic file and said private encryption key;
i. a notice of said encrypted file, said user webpage of said encrypted file owner being configured to display said encrypted file notice, said encrypted file notice on selection by said registered user configured to command said client computer to decrypt said encrypted file, said client computer being configured to download said encrypted file and retrieve said private encryption key to said virtual memory of said client computer, said client computer being further configured to decrypt said encrypted file and erase and overwrite said virtual memory.

4. The system of claim 3, wherein the system further comprises;
a. a permission, said permission granted by said encrypted file owner to a permitted registered user, said permission authorizing said permitted registered user to access said private encryption key and decrypt said encrypted file;
b. a user webpage of said permitted registered user, said user webpage of said permitted registered user configured to display a notification of said permission that contains a link to download and decrypt said encrypted file.

5. The system of claim 4, wherein the system further comprises;
a. said encrypted file owner granting a permission to individuals, groups or companies;
b. said encryped file owner granting a permission for a specific duration that will expire and becomes inactive on the date and at the time specified by said encrypted file owner;
c. said encryped file owner granting, limiting, or restricting a permission at the time of encryption and expiring, modifying or withdrawing said permission at any time afterwards.

* * * * *